(12) United States Patent
Tomlins et al.

(10) Patent No.: US 6,954,461 B1
(45) Date of Patent: Oct. 11, 2005

(54) COMMUNICATIONS NETWORK (75) Inventors: Andrew Geoffrey Tomlins, Harlow (GB); Simon Daniel Brueckheimer, London (GB); David John Stacey, Stansted Abbotts (GB); John A Shotton, Wickford (GB); Osama Bhagat, Harlow (GB); Greg Bernstein, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/470,629

(22) Filed: Dec. 22, 1999

(Under 37 CFR 1.47)

(30) Foreign Application Priority Data

Dec. 22, 1998 (GB) .............................................. 9828371

(51) Int. Cl.[7] .............................................. H04L 12/56
(52) U.S. Cl. .................... 370/395.5; 370/466; 370/469; 370/473
(58) Field of Search ............................. 370/395.5, 473, 370/352–356, 465–467, 395.1, 395.51, 395.6, 395.61, 395.63, 395.64, 395.65, 907, 351, 357, 375–376, 378, 379, 389, 412, 428, 468, 469–471

(56) References Cited

U.S. PATENT DOCUMENTS

| | | | | |
|---|---|---|---|---|
| 5,710,756 A | * | 1/1998 | Pasternak et al. ........... | 370/216 |
| 5,862,136 A | * | 1/1999 | Irwin ....................... | 370/395.4 |
| 6,108,336 A | * | 8/2000 | Duault et al. ............ | 370/395.6 |
| 6,222,843 B1 | * | 4/2001 | Mauger ...................... | 370/397 |
| 6,266,343 B1 | * | 7/2001 | Caves ........................ | 370/466 |
| 6,282,189 B1 | * | 8/2001 | Eames ........................ | 370/352 |
| 6,510,163 B1 | * | 1/2003 | Won ........................... | 370/466 |

OTHER PUBLICATIONS

Protocols.com, Protocol Directory—ATM Signalling & Routing, pp 1–2.

* cited by examiner

*Primary Examiner*—Dang Ton
*Assistant Examiner*—Inder Pal Mehra
(74) *Attorney, Agent, or Firm*—Barnes & Thornburg (57) ABSTRACT

A method of adapting synchronous time division multiplexed (TDM) traffic at an interface between a synchronous network in which the traffic is transported in frames identified by corresponding pointers and labels and an asynchronous network in which the adapted traffic is transported in cells, the method comprising mapping said synchronous frames into primary multiplexed groups, mapping each said primary multiplexed group into traffic cells in a respective asynchronous virtual channel, and providing that virtual circuit with a corresponding virtual channel indicator, and wherein said pointers and labels are mapped into one or more separate asynchronous cells for transport ahead or said traffic cells.

12 Claims, 11 Drawing Sheets

Fig. 4 a) Asynchronous Input Primary Multiplex Signals (E1s)

| #A | (n−1) 31\|0 (frame n) 31\|0 (frame n+1) 31\|0 (frame n+2) |
| #B | (frame n−1) 31\|0 (frame n) 31\|0 (frame n+1) 31\|0 (frame n+2) |
| #C | \|0 (frame n−1) 31\|0 (frame n) 31\|0 (frame n+1) 31\|0 | b) Frame Synchronized Primary Multiplex Signals (E1s)

| #A | 31\|0 (frame n) 31\|0 (frame n+1) 31\|0 |
| #B | 31\|0 (frame n) 31\|0 (frame n+1) 31\|0 |
| #C | 31\|0 (frame n−1) 31\|0 (frame n) 31\|0 | equipment frame synchronization reference ⟶ c) Byte Synchronized Primary Multiplex Signals (E1s)

| #A | (n) 15\|16 (n) 31:0 (n+1) 15\|16 (n+1) 31:0 (n+2) 15\|16 (n+2) |
| #B | (n)7\|8 (n) 31:0 7\|8 (n+1) 31:0 7\|8 (n+2) |
| #C | (n−1) 23\|24 :0 (n) 23\|24 :0 (n+1) 23\|24 (n+1) |

Pointer Value ⟶ d) Byte Synchronized E1s after Switching: null switch

| #A | (n−2) 31\|0 (n) 15:16 (n−1) 31\|0 (n+1) 15:16 (n) 31\|0 (n+2) | timeslot integrity for Px64 kbit/s lost at sync boundary ⟶ e) Frame Slipping for fast i/p, buffer store full ⟵ frame n+1 removed

| 31\|0 (frame n) 31\|0 (frame n+2) 31\|0 (frame n+3) | for slow i/p, buffer store empty ⟵ frame n repeated

| 31\|0 (frame n) 31\|0 (frame n) 31\|0 (frame n+1) | f) Byte Slipping for fast i/p, buffer store full ⟵ byte 16 of frame n+1 removed

| (n) 15\|16 (n) 31:0 (n+1) 15\|17 (n+1) 31:0 (n+2) 16\|17 |

Original Pointer Value ⟶ New Pointer Value ⟶ for slow i/p, buffer store empty ⟵ byte 15 of frame n+1 repeated

| (n) 15\|16 (n) 31:0 (n+1) 15\|15 (n+1) 31:0 (n+2) 14\|15 |

Original Pointer Value ⟶ New Pointer Value ⟶

COMMUNICATIONS NETWORK

This invention relates to communications networks, and in particular to the transport of time division multiplex (TDM) traffic over an asynchronous network.

BACKGROUND OF THE INVENTION

Digital telecommunication systems are currently evolving from the so-called first generation of narrow band networks, which are primarily directed to the handling of voice and data traffic, to a new generation of broad band networks which can carry a full range of multimedia services. Within a typical narrow band network, traffic and control information are carried in 64 kbit/s bearer channels using time division multiplexing (TDM). Routing to establish communications channels between end users is determined by the network nodes each of which is provided with a set of routing tables so as to set up an optimum route for each communication. The new broad band networks however are asynchronous in nature and carry traffic in the form of packets of cells each of which incorporates a header containing information whereby the packet is muted by the asynchronous swing fabric. Thus, if narrow band network traffic is to be carried over a broad band network, there is a problem of interfacing the narrow band circuit switched environment with the broad band packet environment. Further, there are differences in signalling protocols between the two types of network, and there is thus a need for a mechanism for carrying the narrow band signalling traffic over the broad band network such that the narrow band signalling remains fully functional.

A great deal of narrow band, typically voice, traffic is transported via the synchronous digital hierarchy (SDH) or the equivalent North American SONET protocol. Further legacy systems employ the plesiochronous digital hierarchy (PDH). In such systems, digitised traffic from a large number of users is packed into virtual containers which are multiplexed up into synchronous or plesiochronous frames prior to transmission. The transmission is time division multiplex (TDM) based. There is thus a problem in adapting this synchronous or plesiochronous bulk traffic for transport over a cell-based asynchronous network, and re-adapting the transported traffic from the cell-based ATM back to the original TDM-based synchronous or plesiochronous transport. This is becoming an increasing problem in current TDM transmission systems which are moving towards higher orders of multiplexing and correspondingly higher bit rates in an attempt to improve traffic handling capacity.

At present, this problem is addressed by the use of a residual time stamp technique (RTS) such as that described in U.S. Pat. No. 5,280,978. This technique provides a method and apparatus for recovering the timing signal of a constant bit rate input service signal at the destination node of a synchronous ATM telecommunication network. At the source node, a free-running P-bit counter counts cycles in a common network dock. At the end of every RTS period formed by N service dock cycles, the current count of the P-bit counter, defined as the RTS, is transmitted in the ATM adaptation layer. At the destination node, a pulse signal is derived in which the periods are determined by the number of network clock cycles represented by the received RTSs. This pulse signal is then multiplied in frequency by N to recover the source node service clock.

Whilst this technique provides a solution to the problem, it introduces significant complexity at the adaptation interface between the synchronous/plesiochronous and ATM networks.

SUMMARY OF THE INVENTION

It is an object of the invention to provide an improved system and method for transporting narrow band traffic over a broad band network.

According to a first aspect of the invention there is provided a method of adaptation of a frame structure of time division multiplexed (TDM) channels into a group of complete ATM cells transmitted each TDM frame period, wherein each byte of the TDM frame structure is mapped to a particular byte of a particular and identifiable cell of the group of cells.

According to a further aspect of the invention, there is provided an arrangement for adapting a frame structure of time division multiplexed channels into a group of ATM cells, which cells are transmitted in a time period corresponding to the frame period, wherein each byte of the frame structure is mapped to a corresponding byte of an identifiable cell of said group of cells.

According to another aspect of the invention, there is provided an arrangement for adapting frame based time division multiplexed traffic to asynchronous transfer mode transport, the arrangement comprising adaptation means for adaptation of a frame structure of time division multiplexed (TDM) channels into a group of complete ATM cells transmitted each TDM frame period. Each byte of the TDM frame structure is mapped to a particular byte of a particular and identifiable cell of the group of ATM cells.

According to another aspect of the invention, there is provided an arrangement for adapting frame based time division multiplexed (TDM) traffic to asynchronous transfer mode transport, the arrangement comprising a first TDM card incorporating a multiplexer/mapper coupled via a set of framers to a first adaptation function, an ATM adaptation card incorporating a second ATM adaptation function coupled to one or more data transfer elements, and a single ATM backplane providing a coupling between said first and second adaptation functions.

According to a further aspect of the invention, there is provided a method of adapting synchronous time division multiplexed (TDM) traffic at an interface between a synchronous network in which the traffic is transported in frames identified by corresponding pointers and labels and an asynchronous network in which the adapted traffic is transported in cells, the method comprising mapping said synchronous frames into primary multiplexed groups, mapping each said primary multiplexed group into traffic calls in a respective asynchronous virtual channel, and providing that virtual circuit with a corresponding virtual channel indicator, and wherein said pointers and labels are mapped into one or more separate asynchronous cells for transport ahead of said traffic cells.

The technique allows physical separation of TDM interface functions from DSP voice processing and/or real ATM adaptation functions and interconnection across a generalised ATM-based backplane typically provided on a mainly ATM equipment. This separation is particularly beneficial for higher traffic capacities, e.g. STM-1 or greater.

BRIEF DESCRIPTION OF THE DRAWINGS

An embodiment of the invention will now be described with reference to the accompanying drawings in which.

DESCRIPTION OF PREFERRED EMBODIMENT

Figure 1:
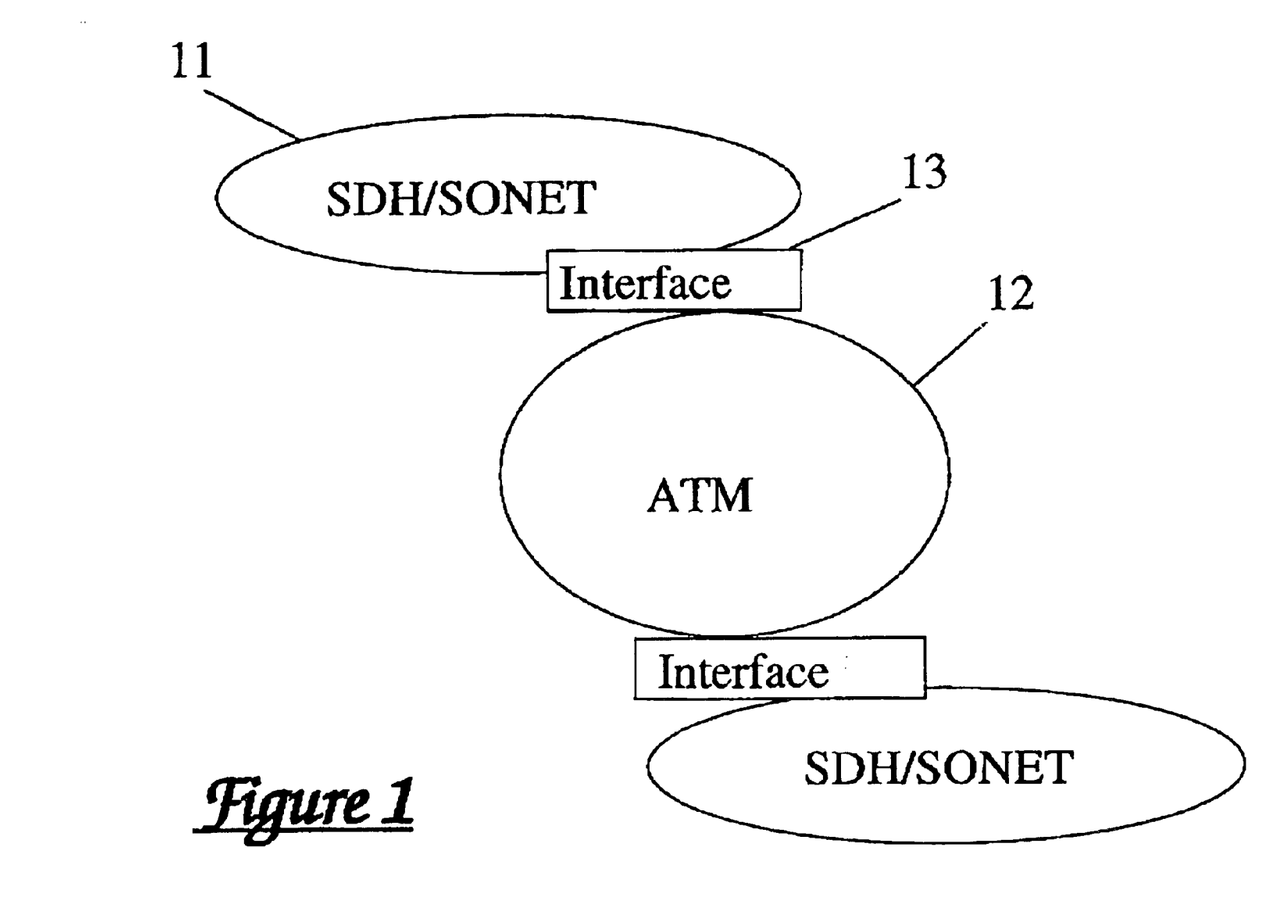
FIG. 1 is a general schematic view of a synchronous network interfaced with an asynchronous network.

Referring first to FIG. 1, this illustrates in schematic form a network arrangement in which synchronous networks 11 are interfaced with an asynchronous (ATM) network 12 via respective interlaces 13, the latter performing adaptation of the frame based synchronous or plesiochronous network traffic into ATM cells for transport over the asynchronous network and re-adaptation of the transported traffic to the synchronous or plesiochronous TDM format an egress from the asynchronous network. Within each synchronous network, digital traffic is carried in 64 kbit/s or px64 kbit/s channels which are typically multiplexed into E1 (2048 kbit/s) or T1 (1544 kbit/s) primary multiplexed signals which are in turn multiplexed up into a variety SDH/SONET higher order multiplexed signals. A suitable TDM/AAL protocol or reference model for use in the network arrangement of FIG. 1 is illustrated schematically in FIG. 2.

Figure 3:
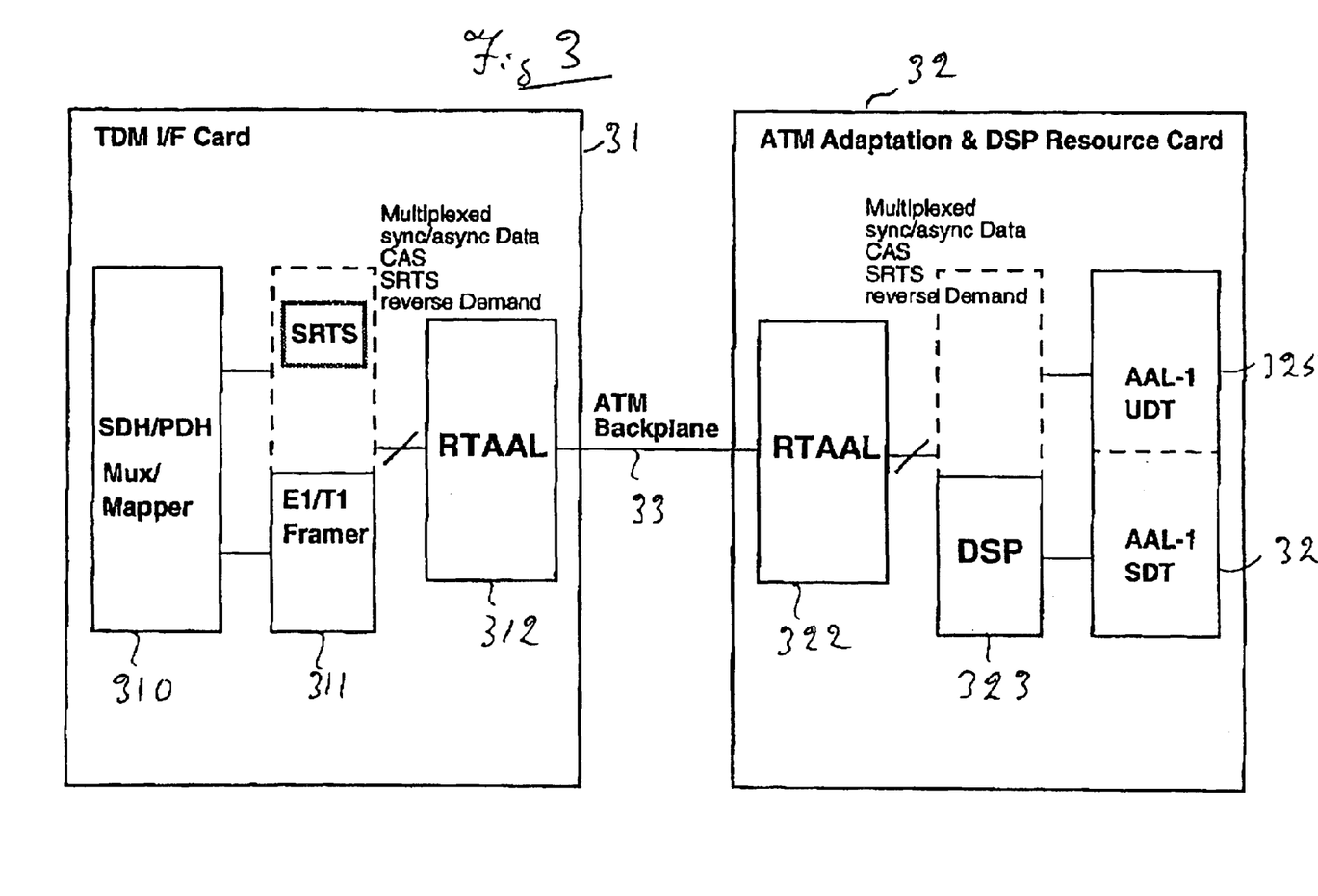
FIG. 3 illustrates an adaptation interface according to a preferred embodiment of the invention.

Referring now to FIG. 3, this shows in schematic form a preferred construction of an interface between one or more TDM transport networks and an ATM network. The interface comprises a TDM portion or resource card 31 and an ATM adaptation portion or resource card 32 interconnected via an ATM backplane 33. The TDM portion 31 comprises an SDH/PDH multiplexer/mapper 310, a number of E1/T1 framers 311 coupled to corresponding ports of the multiplexer/mapper 310 and an adaptation function (RTAAL) 312. Each framer 311 examines the incoming, e.g. 2 Mbit/s, bit stream to determine the framing in E1s or T1s, to terminate the overheads and to identify the time slots. The identified time slots are then mapped into cells by the RTAAL 312. Each time slot corresponds to a particular byte in a set of cells.

Figure 2:
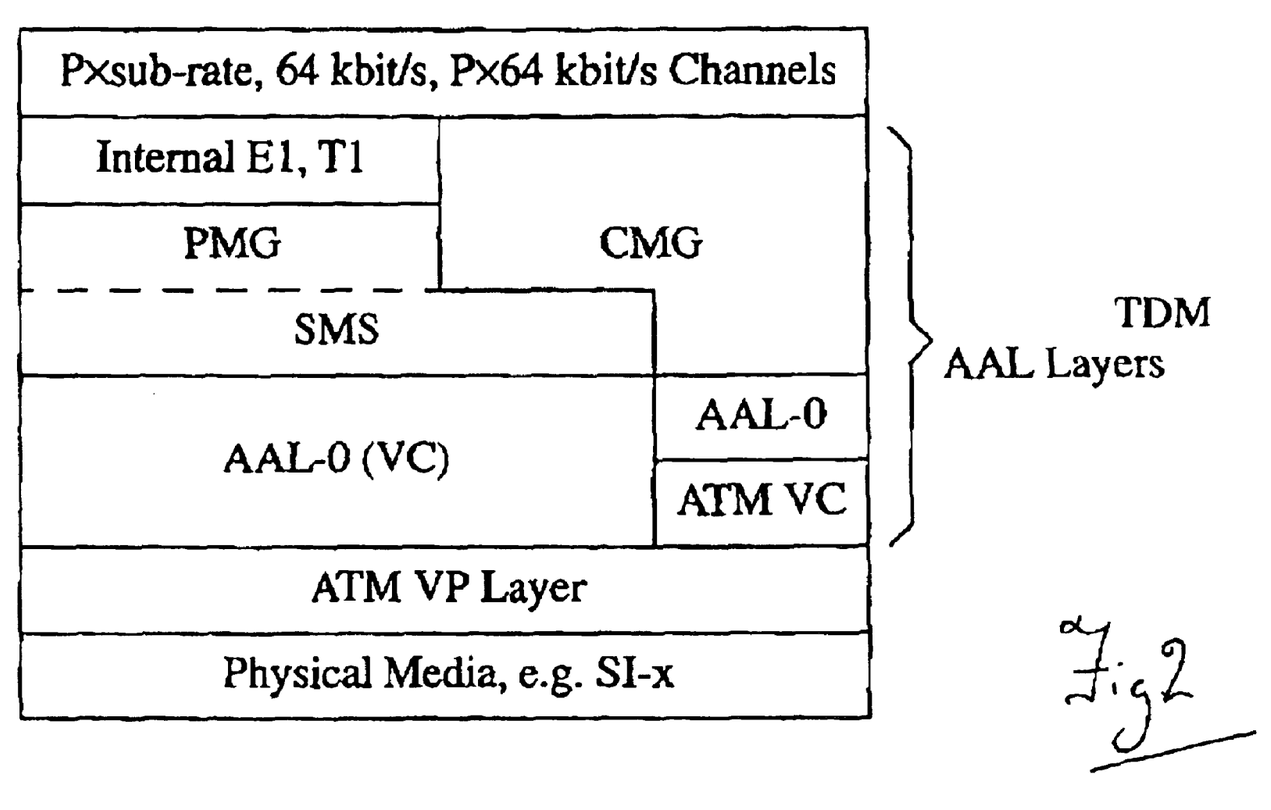
FIG. 2 shows in schematic form a TDM/AAL protocol reference model for use in the network arrangement of FIG. 1.

Advantageously, the interface arrangement of FIG. 2 is provided in the form of an integrated circuit.

The ATM adaptation resource card incorporates an adaptation function (RTAAL) 322 coupled via a set of digital signal processors (DSP) 323 to a structured data transfer function (SDT) 324 and an unstructured data transfer function (UDT) 325.

Traffic is carried around in the synchronous network by standard TDM higher order structures, i.e. PDH or SDH. These structures are terminated and the traffic re-multiplexed in the RTAAL upper layer multiplex structure using the pointers and labels before being adapted to ATM.

The arrangement of FIG. 3 provides adaptation of a frame structure of time division multiplexed (TDM) channels into a group of complete ATM cells transmitted each TDM frame period. Each byte of the TDM frame structure is mapped to a particular byte of a particular and identifiable cell of the group of ATM cells.

The synchronous primary multiplex signals E1 and T1 are synchronised by terminating their framing signals and overhead bits, and passing their constituent 64 kbit/s basic rate channels or time slots, or sub-rate channels, via a buffer store to the local node clock. Advantageously, adaptation to ATM is performed using AAL-0, that is, using all forty eight payload bytes of each ATM cell for traffic data. In using AAL-0, specific use of the ATM header field is made, adaptation being in effect direct to the virtual path (VP) level. The protocol layers associated with the TDM AAL (ATM adaptation layer) are shown in the reference model of FIG. 2 described above.

The signals which the format is intended to support are defined as follows:

The format is not required to carry directly higher order TDM signals such as SDH STM-1 or PDH E4, T3, or E3. Such higher order signals are first de-multiplexed to their constituent E1/T1 primary multiplex signals.

As there is a need to carry such higher order TDM signals on internal links, it is possible to adapt such signals to ATM using AAL-0.

The format is not designed for bulk transparent transport of asynchronous E1s or T1s, as it is assumed that adaptation of asynchronous E1/T1a via AAL-1 for CES will be performed on the same module as TDM interface or multiplex functions.

Figure 4:
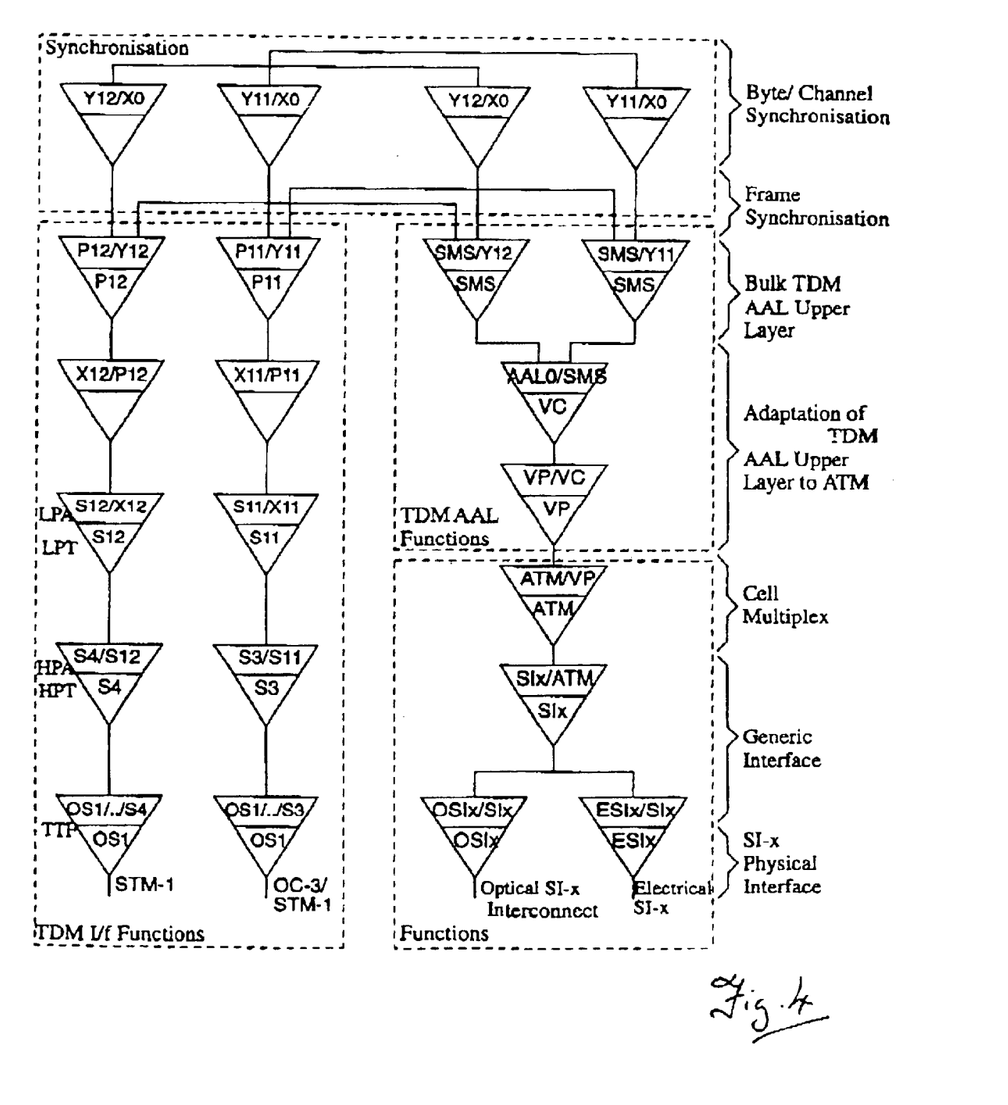
FIG. 4 illustrates the context of the TDM AAL in the various transport signal layers in the network arrangement of FIG. 1.

The context of the TDM AAL in the various transport signal layers is shown using an atomic functional model diagram as shown in FIG. 4. It will be appreciated that in FIG. 4. SDH and SONET TDM interfaces are shown for illustrative purposes.

Traffic arriving from the TDM domain comprises 64 kbit/s or Px64 kbit/s channels multiplexed in either E1 or T1 primary multiplex signals which are in turn multiplexed in a variety of SDH/SONET or PDH higher order multiplex signals. The E1s and T1s consist of thirty one and twenty four voice/data/signalling time slots respectively, forming a primary digital group, plus overhead, and framing. Each time slot is transmitted in a frame structure once every 125 $\mu$s (8 kHz). The frame structure of each incoming E1/T1 will in general have its own phase relative to other E1/T1s and the equipment frame reference.

A function of the TDM AAL is to transmit synchronised 64 kbit/s channels with the minimum of delay. A number of measures are taken to achieve this, including the use of internal E1 and T1 primary digital groups, byte/channel synchronisation, and time division multiplexing of the internal E1s and T1s in bulk within a single ATM cell stream.

In a preferred embodiment, a plurality of 64 kbit/s channels or time slots are multiplexed into a primary digital group consisting of 48 time slots, termed a multiplex group (MG). There is no specific assignment of time slots of externals E1s and T1s to MG time slots. A multiplex group (MG) is mapped directly into an ATM virtual channel (VC) using AAL-0, where all 48 payload bytes carry user data, with the time slot group frame boundary coinciding with the ATM cell boundary. Any particular 64 kbit/s time slot thus occupies a fixed position within the payload area of the ATM cells.

In the TDM AAL, Internal E1 and T1 primary digital (time slot) groups are used which correspond closely to external E1s and T1s. The framing bit (193rd bit) of an external T1 is terminated and not passed through so that an internal synchronised T1 consists of purely 24 64 kbit/s channel time slots (effectively 1536 kbit/s). For simplicity an internal synchronised E1 consists of 32 time slots so that although the framing byte in TS0 is terminated it may also be passed through if required.

The process of transferring 64 kbit/s time slots from external primary multiplex signals to internal E1/T1s or MGs is known as synchronisation. While not strictly part of the of the TDM AAL, an understanding of this function facilitates the understanding of the format.

Figure 5:
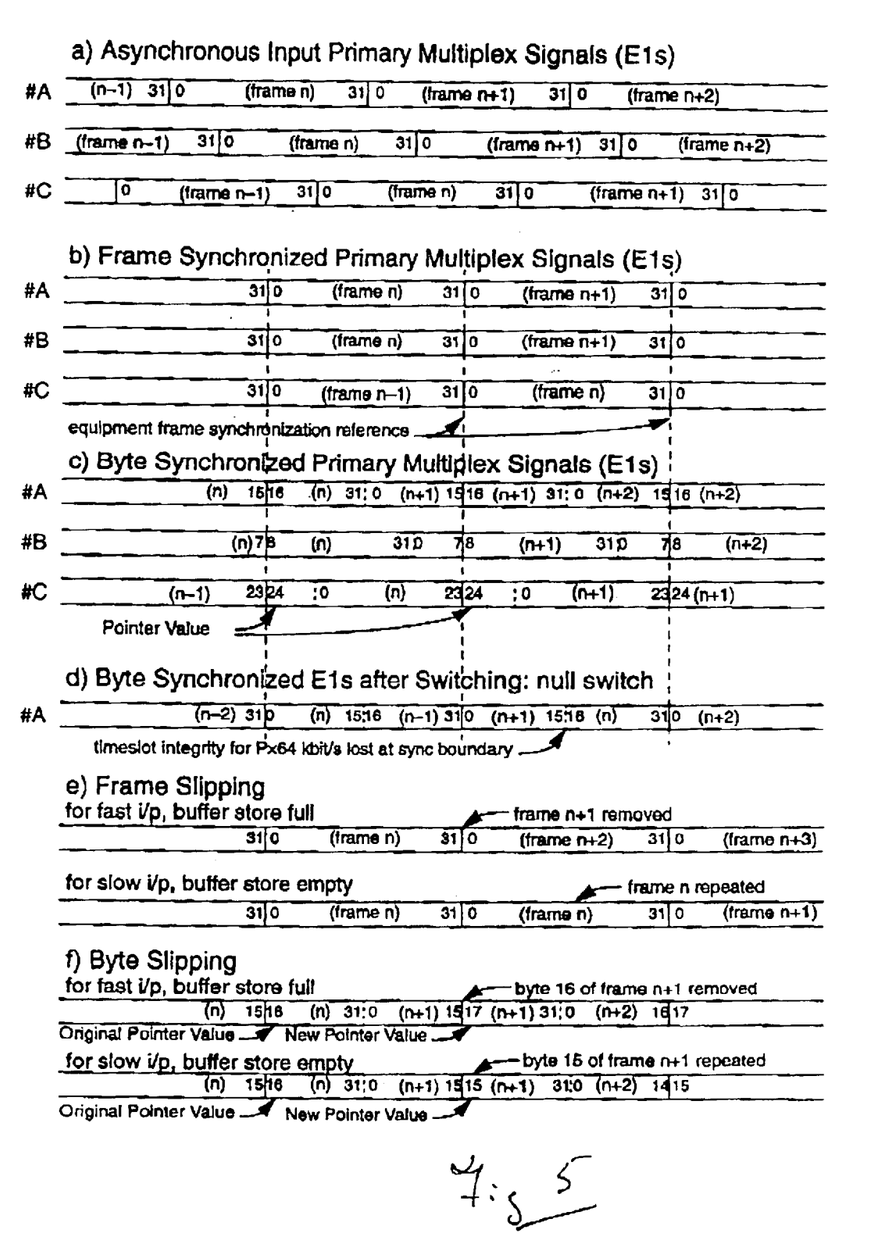
FIG. 5 illustrate a process of byte synchronization employed in the network arrangement of FIG. 1.

Byte Synchronisation:

To minimise the synchronisation delay a process is employed in which the frame phase of each internal E1/T1 corresponds to that of the external E1/T1. The delay due to phase offset associated with frame synchronisation is avoided, and buffering is then limited to absorbing network jitter and wander and cell assembly delay. As a result individual channels no longer occupy fixed positions within the bytes assigned to an internal E1/T1 in the cells carrying the TDM AAL signal. The phase offset to the node frame reference is indicated by a pointer (analogous to an SDH TU pointer for a byte synchronously mapped tributary signal) transmitted at the beginning of the node frame. This process is known as byte synchronisation and is illustrated in FIG. 5.

Synchronisation of Frequency Asynchronous (Plesiochronous) E1s and T1s:

Under normal conditions E1s and T1s originating in the same operator's network will be frequency synchronous (homochronous) with the equipment node. However, E1s and T1s originating in a different operator's network with a different primary reference dock will in general have a small continuous frequency difference from that of the node ($D_{max}=\pm 2\times 10^{-11}$) (plesiochronous). Under fault conditions this may become much worse. For example, a G.812 clock (=stratum 2) may default to $\pm 10^{-8}$, or in the worst case a E1 or T1 could be transmitted at ±50 ppm. Such a frequency difference results in a continually changing phase offset.

With the above described byte synchronisation, a changing phase offset can be accommodated by changing the pointer value. Unlike byte synchronous mapping in SDH, there are no justification opportunity bytes. As a pointer value changes (by ±1) from one node frame to the next, a byte of one channel/time slot must be removed or repeated, i.e. controlled byte or octet slips, as shown in FIG. 5. A continuous frequency offset will result in each channel being sipped in turn, producing the same long term slip rate per channel as for the frame synchronisation case. The process of slipping will in general be needed to centralise the fill of buffer stores at start-up and after a E1/T1 frame re-alignment (e.g. after a transmission fault).

Synchronisation of Plesiochronous E1s and T1s with Px64 kbit/s Services:

There is a general requirement for 64 kbit/s services to preserve time slot or octet sequence integrity. For Px64 kbit/s services time slot sequence integrity includes preserving the order of the P bytes of each 125 µs frame. Furthermore, for Px64 kbit/s 8 kHz structured services (P=2, 6, 24, 30, or N contiguous time slots in a frame) the requirement in ITU-T recommendation 1231[9] is to preserve 125 µs frame and the next set of P bytes must be preserved.

Byte synchronisation causes bytes of different E1/T1 frames to be transmitted in the same node frame because of the arbitrary input phase alignment. With certain designs of time slot interchanger implementing a 64 kbit/s switch, this could result in the loss of time slot sequence integrity of Px64 kbit/s channels, as can be seen in FIG. 5.

We have found that loss of time slot sequence integrity can be avoided whilst still achieving minimum delay by ensuring that P bytes of an incoming E1/T1 frame are transferred to the same node frame in the following manner. Since the group of P bytes is specified (in ITU-T recommendation G.704) to be contiguous in an E1 or T1 frame, if the position in the frame and value of P were known for each Px64 kbit/s channel they could be slipped by the number bytes of the channel in a frame (P bytes) at a time, and the pointer value changed by ±P bytes. This could be termed channel synchronisation rather than byte synchronisation. With single 64 kbit/s channels; and frame synchronisation is a simpler solution than channel synchronisation.

Primary Multiplex Groups:

For maximum flexibility, internal E1s and T1s are grouped in primary multiplex groups (PMG). A PMG-21 can contain either 3×E1s or 4×T1s and is analogous to an SDH TUG-2 or a T2 (6312 kbit/s). The E1s/T1s are byte interleaved in the PMG. The PMG-21 thus compresses 3×32= 4×24=96 bytes/125 µs. PMG-21s are used when interfacing to TUG structured SDH/SONET signals and North American PDH signals.

Advantageously, to improve bandwidth efficiency of the TDM AAL when interfacing with European PDH aggregate signals, a PMG-22 containing 4E1s, analogous to an E2 (8448 kbit/s), is used consisting of 4×32=128 bytes/125 µs.

Secondary Multiplex Signals:

PMGs are multiplexed to form a secondary multiplex signal (SMS) by byte interleaving. When interfacing with an STM-1 SDH signal an SMS comprising 21×PMG-21s (21× 96=2016 time slots) equivalent to 63E1s or 84T1s is required. When interfacing with a T3 or SONET STS-1 signal an SMS comprising 7×PMG-21s (7×96=672 time slots) equivalent to 28T1s (or 21E1s) is required. When interfacing to an E4, which may be embedded in an STM-1, an SMS with 16×PMG-22s (16×128=2048 time slots) equivalent to 64E1s is required; while for interfacing to an E3, which may be embedded via VC-3 or VC-2 in an STM-1, an SMS with 4×PMG-22s (4×128=512 time slots) equivalent to 16 E1s is required.

Figure 6:
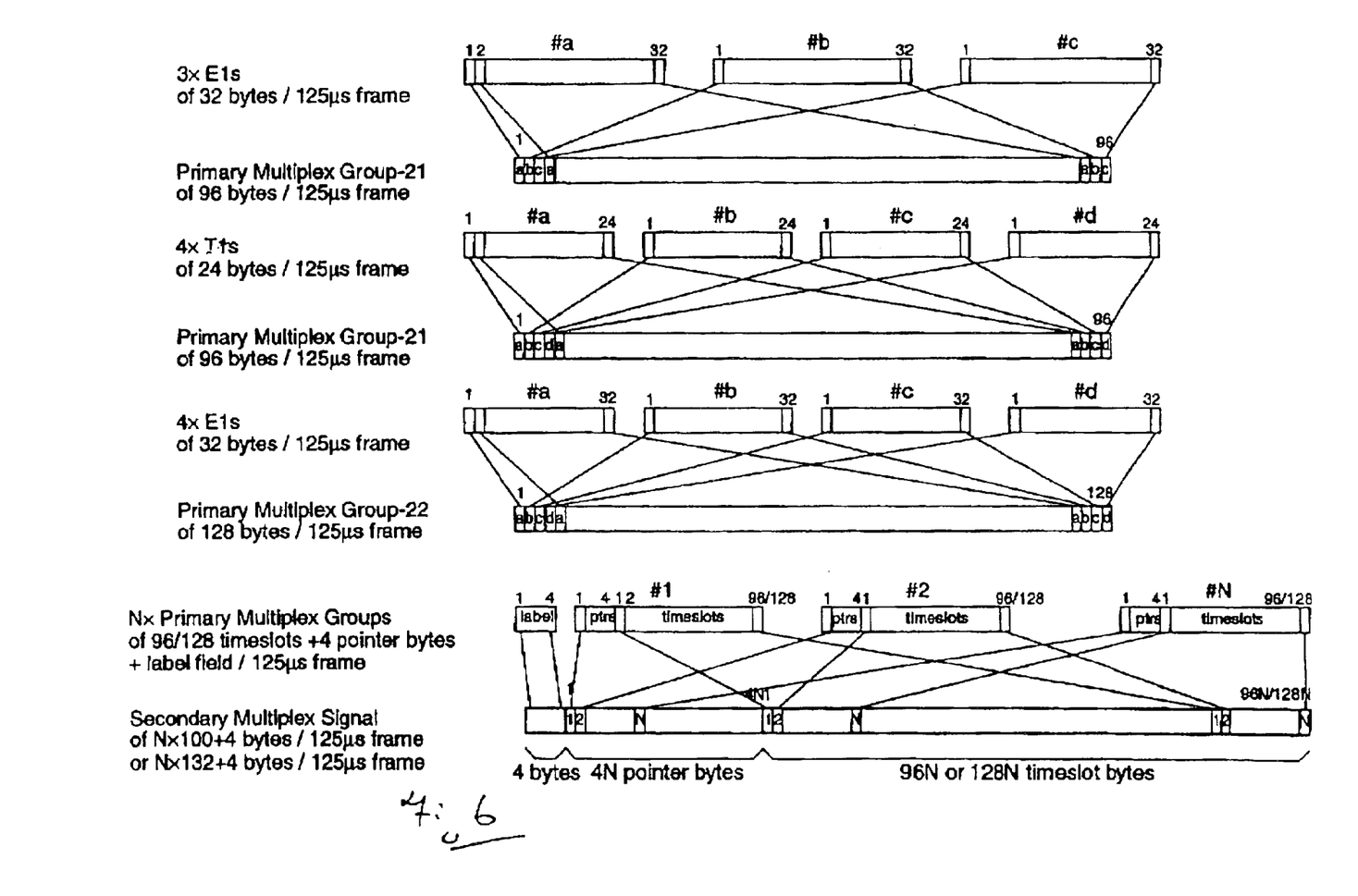
FIG. 6 illustrate the multiplexing of primary multiplex groups (PMG) into a secondary multiplex signal (SMS)

It is not anticipated or envisaged that PMG-21s and PMG 22s will need to be mixed in an SMS. The multiplexing of E1s and T1s via PMGs into an SMS is illustrated in FIG. 6.

E1/T1 Offset Pointers:

The pointer carrying the frame phase offset for each internal E1 or T1 is placed in a pointer byte. The pointer bytes of each PMG are assigned to a set of 4 bytes in the order of the E1/T1s in the PMG, and the N sets of 4 bytes for N×PMGs are byte interleaved into 4×N bytes at the start of the SMS frame, as shown in FIG. 6. When a PMG-21 carries 3 E1s the first byte of 4 is not used but set to the value 24 (decimal) which would be invalid for a T1.

Within each pointer byte the pointer value is transmitted in a five bit field and indicates the number of the first time slot of the E1/T1 transmitted in the rode 125 µs frame. The other three bits are used for pointer byte parity, an optional multi-frame indication bit, and a bit reserved for future use. Pointer parity is mandatory and is specified to be odd party over the whole byte, that is the parity bit is adjusted to ensure an odd number of Ones taking into account all eight bits of the byte including the parity bit itself. Multi-frame indication is reserved for use with sub-rate channels, i.e. 32 kbit/s, 16 kbit/s, and 8 kbit/s. The bit is toggled to produce an even mark-to-space ratio signal at the sub-rate byte frequency. When not used, i.e. for 64 kbit/s, the bit is set to a default value of zero and ignored at the receiving end. The reserved bit is also set to zero and ignored at the receiving end.

Figure 7:
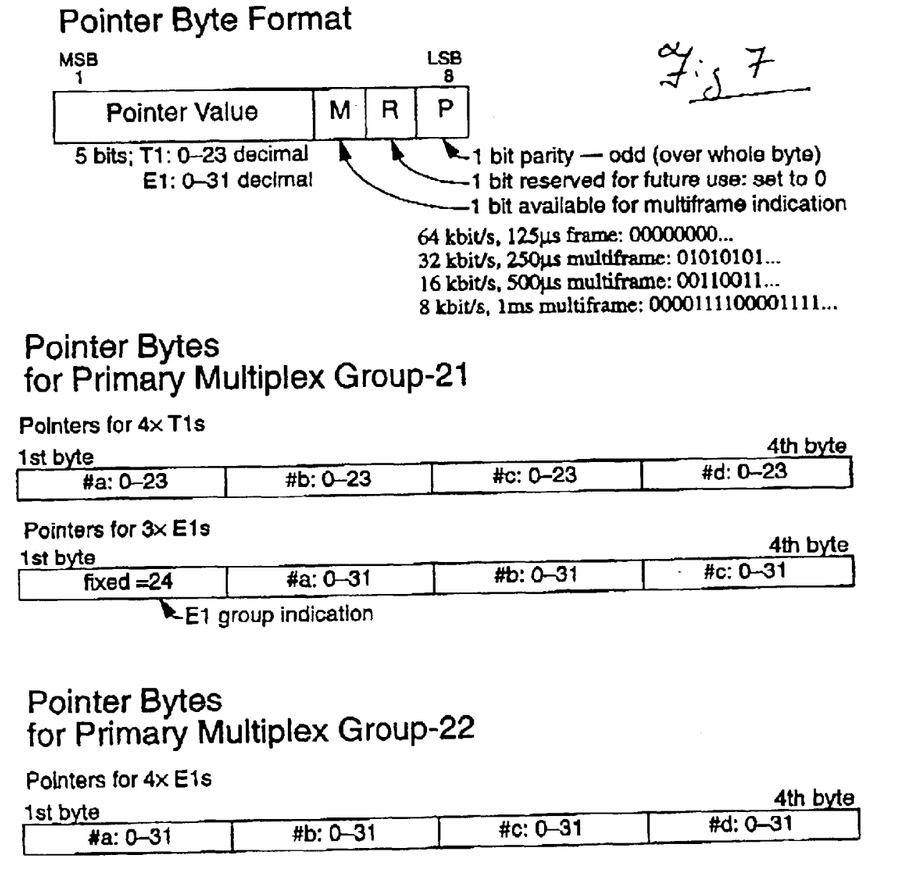
FIG. 7 shows the format of offset pointers.

The preferred format of pointers for primary multiplex groups 21 and 22 is shown by way of example in FIG. 7.

A slip must be co-ordinated with a pointer change. A pointer change is simply indicated by sending the new value. For internal equipment SI-x links, in contrast to SDH, no elaborate pointer protection is deemed necessary. The only error protection is the general SI-x call error check (CEC) and the pointer parity. If these are good the new value can be assumed correct.

There is no fundamental requirement as to how often the pointers need be sent. For simplicity and the minimum slip waiting time the pointers should preferably be sent every 125 µs frame. However, in some applications, e.g. to provide a minimum bandwidth option for when delay is deemed not critical, it is possible to not send the pointers at all, the pointer values being fixed by default at zero corresponding to frame synchronised E1/T1s and CMGs.

Adaptation to ATM:

The TDM AAL signals are adapted to ATM using AAL-0, i.e. using all 48 cells payload bytes. Furthermore an integral number of cells is transmitted every 125 µs frame.

PMG-21s have 96 bytes, equivalent to 2×48 byte cell payloads, and so the bytes of N×PMG-21s in an $MS frame occupy exactly 2×N cells/125 µs. PMG-22s have 128 bytes and so the bytes of N×PMG-22 in an SMS frame will not in general map exactly into an integral number of 48 byte cell payloads. Instead, the cell containing the end of the bytes of the PMG-22s in a frame is padded with dummy bytes to obtain an integral number of cells per 125 µs.

Each cell containing E1/T1 time slots (in PMGs) per 125 µs is given its own VCI, numbered from 64(decimal) up. This numbering provides a sequence number. They are given a common VPI so that N×48 time slots can be transmitted and switched together as a single high bandwidth cell stream with minimal inter-cell period and CDV, thus minimising buffering requirements and consequently reducing delay.

Figure 8:
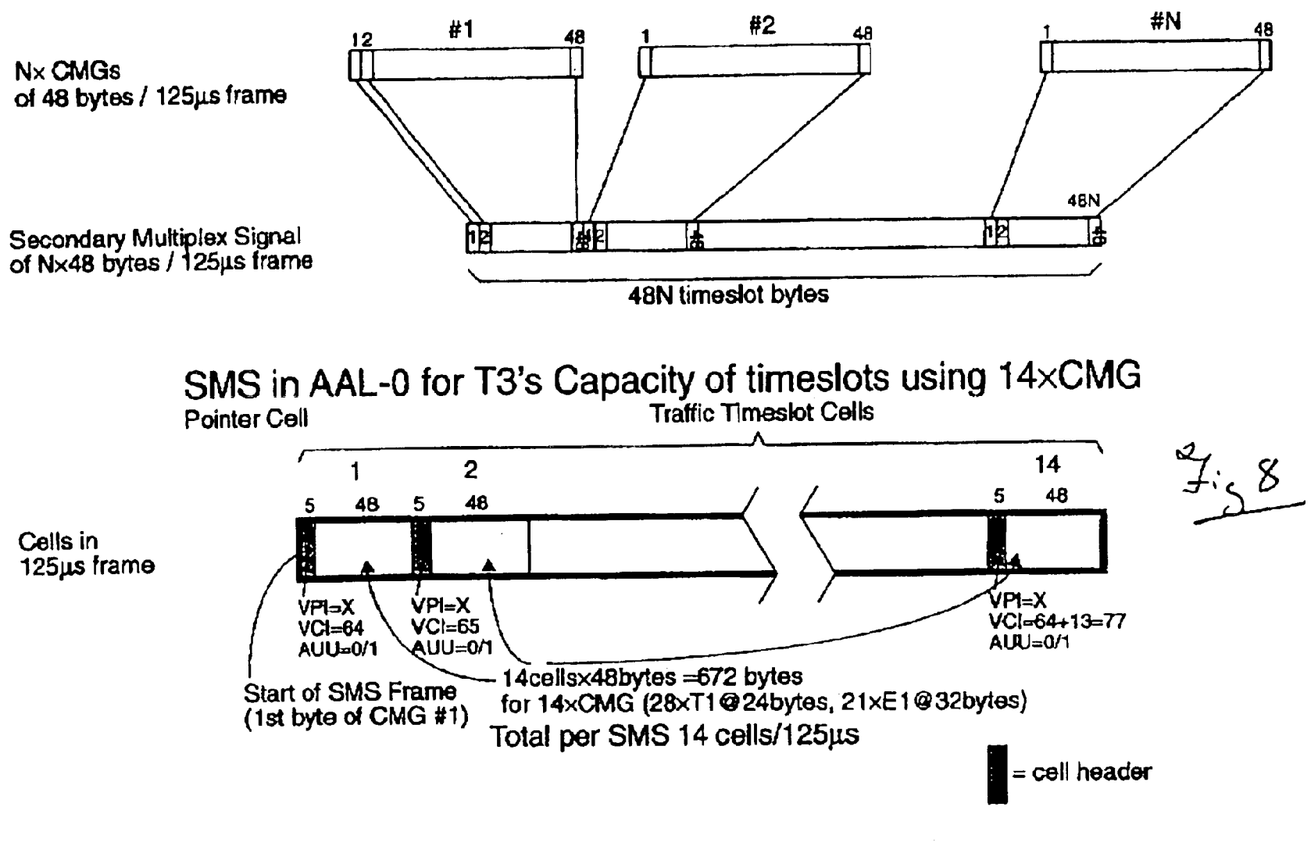
FIGS. 8 to 11 illustrate procedures for the adaptation of multiplex groups.

A CMG is mapped directly into an ATM VC with a particular VCI using AAL-0 with the time slot group frame boundary coinciding with the ATM cell boundary. A set of multiplex groups (MGs) in an SMS have virtual channel indicators (VCI) numbered from 64(decimal) up and a common VPI. The adaptation of an SMS with 14 MGs is shown by way of example in FIG. 8.

Additional MGs following PMGs are adapted to a VC with cell transmitted each 125 µs. these cells have the same VPI as the PMG VCs but their own VCI numbered from 64+48=112(dec) up.

The pointers and label field are adapted to a separate AAL-0 cell or cells which are transmitted ahead of the traffic cells of each frame. They ae given the same VPI as the PMG cells of the SMS, but readily distinguishable VCIs; 128 decimal) up. This facilitates the avoidance of the need for sending the pointer cells every 125 µs frame if these are not required, i.e. In those systems which are frame aligned to the node. Without pointer cells, a PMG based TDM AAL signal is indistinguishable from a MG based signal (the only difference may be in the assignment of time slots). The label field plus the pointers of up to 11 PMGs can be fitted into one pointer cell (4+11×4=48 bytes), while for 12–23 PMGs two pointer cells are needed. The last pointer cell is padded with dummy bytes as required to create an integer number of pointer cells per SMS frame.

To be fully compatible, a further form of elementary sequence number may be added by toggling the ATM User-to-User bit (AUU) in PTI field of the ATM header (octet 4, bit 2) at the start of every 125 µs SMS frame, for all the cells in that frame.

Figure 9:
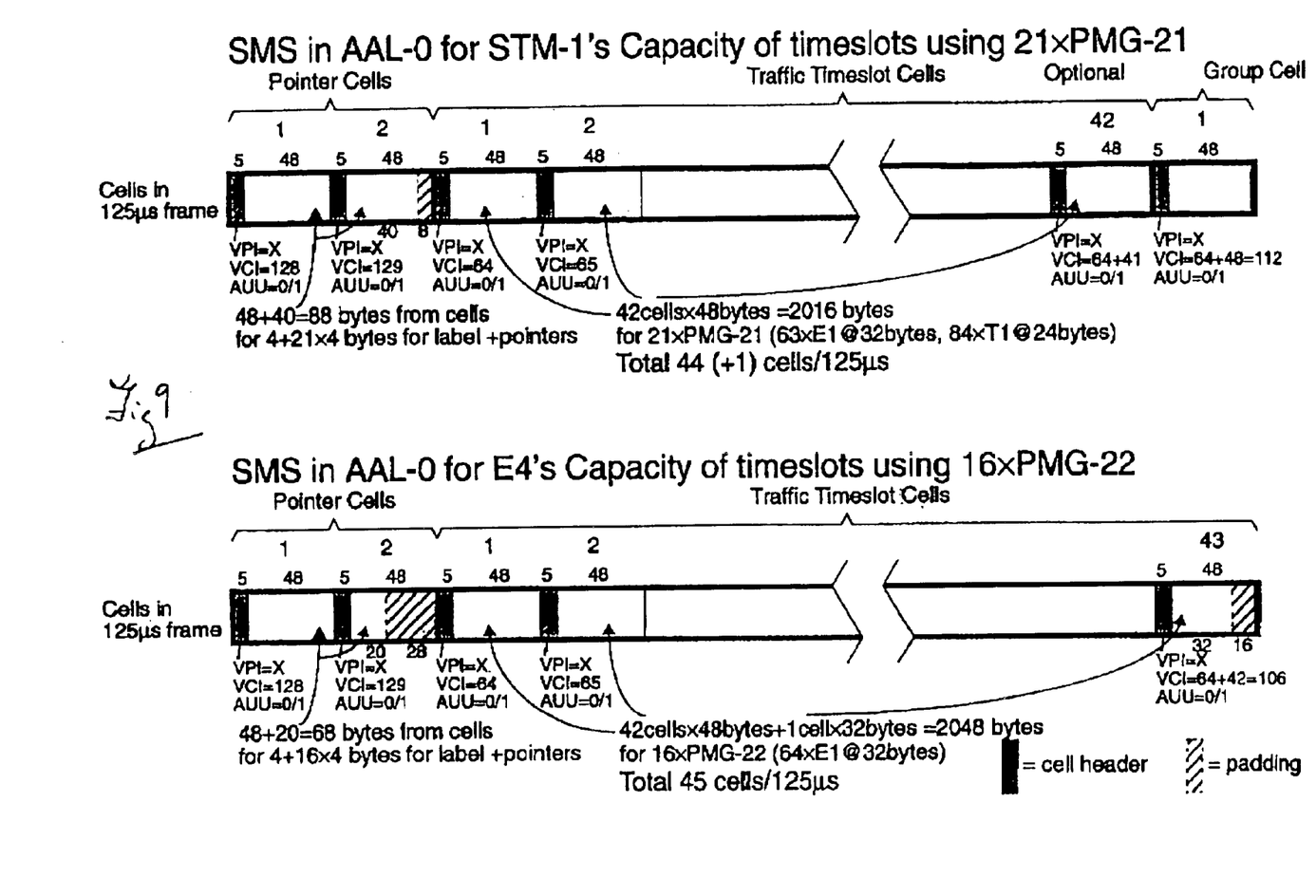

The adaptation of an SMS with twenty one PMG-21s for time slots from a TUG structured SDH/SONET signal and an SMS with sixteen PMG-22s for time slots from an E4 is shown by way of example in FIG. 9.

ATM Multiplexing of TDM AAL Signals:

At a module with a given capacity, e.g. an AVJ module, TDM traffic can come from a single TDM interface e.g. STM-1, in the form of a single SMS with many PMGs, or from several smaller capacity TDM interfaces in the form of several SMSs, each with a smaller number of PMGs. The SMS having been adapted to ATM in the form of a VP can be "statistically" multiplexed at the ATM level in a cell router/switch between the TDM interface modules and the other module. The VP or VPs of the TM AAL will be multiplexed at the ATM cell level with other VP/VCs for control traffic and idle calls to fill the bandwidth of the link.

Figure 10:
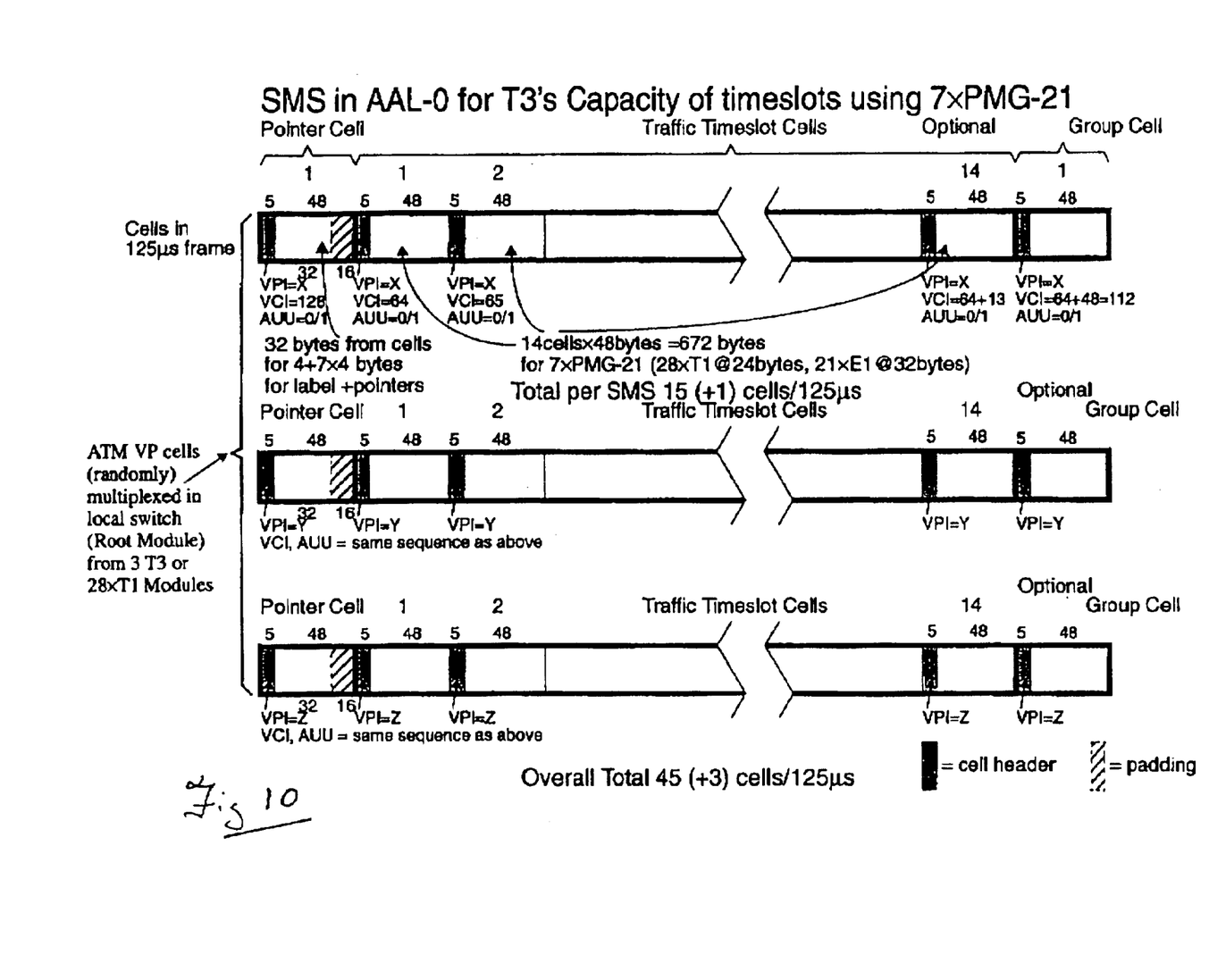
Figure 11:
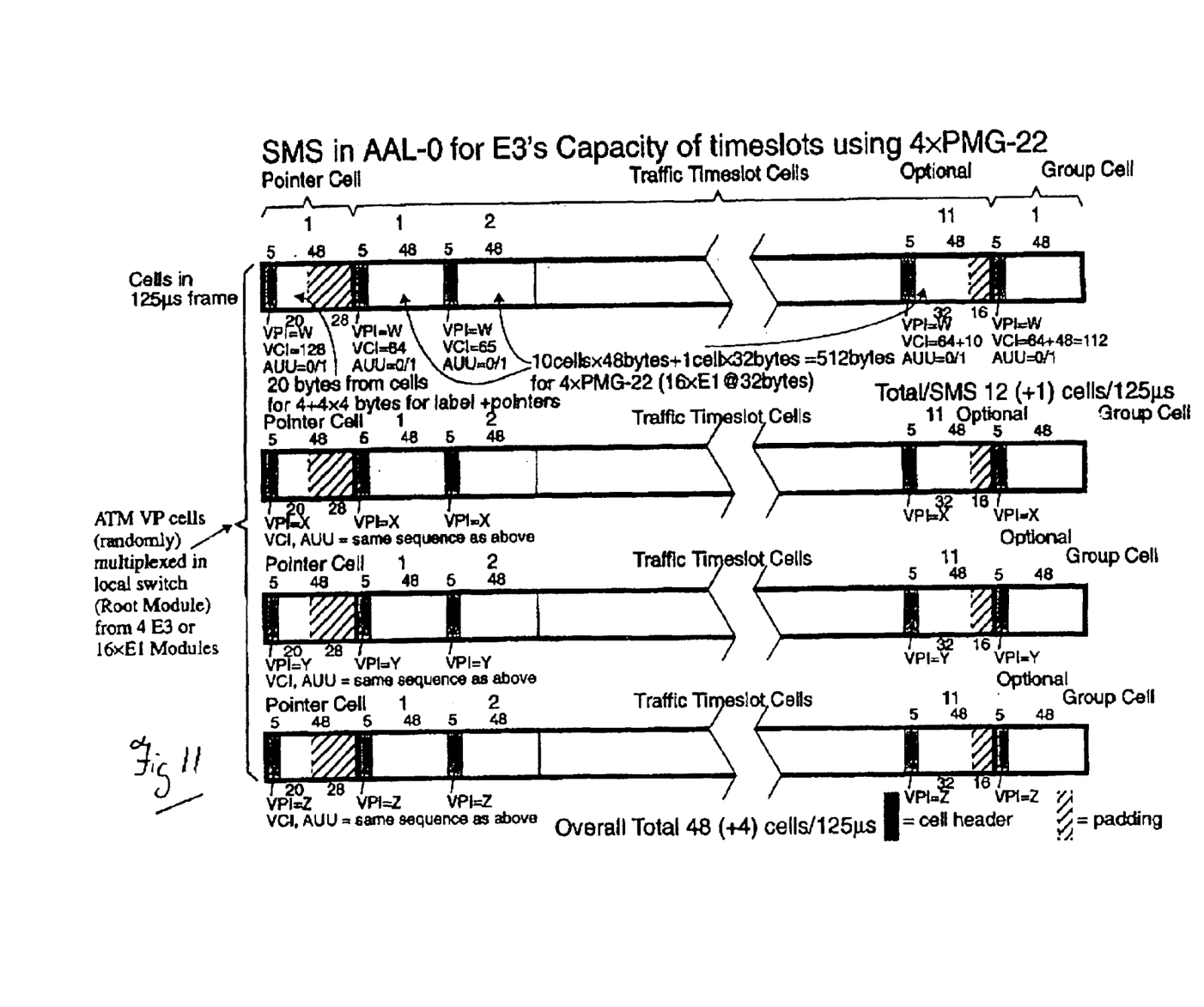

The adaptation of three SMSs with seven PMG-21s for time slots from three T3s is shown by way of example in FIG. 10. The adaptation of four SMSs with four PMG-22s for time slots from four E3s is shown in FIG. 11.

Some modules, e.g. the AVJ may require to receive the channels in a RDM AAL signal in a controlled phase relative to the node frame phase. This means the corresponding transmitting module must generate SMS frames in a phase sufficiently advanced relative to the receiving end to allow for link delay and CDV due to ATM cell multiplexing. For example, to receive four SMSs of four PMG-22s (11 celkls/ 125 µs) a module needs to accommodate four VPs each with a CDV of up to 12 µs.

Although the exemplary system and method have been described above with particular reference to SDH protocols and terminology, it will of course be understood that the techniques described herein are equally applicable to SONET based systems.

It will also be understood that the above description of a preferred embodiment is given by way of example only and that various modifications may be made by those skilled in the art without departing from the spirit and scope of the invention.

What is claimed is:

1. A method of adapting synchronous time division multiplexed (TDM) traffic at an interface between a synchronous network in which the traffic is transported in frames and an asynchronous network in which adapted traffic is transported in cells, the method comprising generating pointers identifying phase of the TDM traffic, mapping said synchronous frames into primary multiplexed groups, mapping each said primary multiplexed group into traffic cells in a respective asynchronous virtual circuit, and wherein said pointers are mapped into one or more separate asynchronous cells for transport ahead of said traffic cells.

2. A method as claimed in claim 1, wherein said primary multiplexed groups are multiplexed by byte interleaving into a secondary multiplexed signal.

3. A method as claimed in claim 2, wherein said asynchronous network is an ATM network carrying ATM cells and said adaptation is performed using ATM adaptation layer zero (AAL0).

4. A method as claimed in claim 3, wherein a time slot group frame boundary coincides with a start of an ATM cell.

5. A method as claimed in claim 1, wherein each cell containing time slots from a synchronous frame is given its own virtual channel indicator, and wherein cells relating to that frame are allocated a common virtual path indicator so that cells can be transmitted and switched together.

6. A method as claimed in claim 1, wherein each of the frames comprises a plurality of time slots, the interface comprises a timing reference and wherein the pointers identify first time slots in the frames relative to the timing reference.

7. An arrangement for adapting synchronous time division multiplexed (TDM) traffic at an interface between a synchronous network in which traffic is transported in synchronous frames and an asynchronous network in which adapted traffic is transported in cells, the arrangement comprising means for generating pointers identifying phase of the TDM traffic, mapping means for mapping said synchronous frames into primary multiplexed groups and for mapping each said primary multiplexed group into traffic cells in a respective asynchronous virtual circuit, and wherein said pointers are mapped into one or more separate asynchronous cells for transport ahead of said traffic cells.

8. An arrangement as claimed in claim 7, and including means for multiplexing said primary multiplexed groups by byte interleaving into a secondary multiplexed signal.

9. An arrangement as claimed in claim 7, wherein each cell containing time slots from a synchronous frame is given its own virtual channel indicator, and wherein cells relating to that frame are allocated a common virtual path indicator so that said cells can be transmitted and switched together.

10. An arrangement as claimed in claim 7, and provided in the form of an integrated circuit.

11. An arrangement as claimed in claim 7, wherein said asynchronous network is an ATM network carrying ATM cells.

12. An arrangement as claimed in claim 7, wherein each of the frames comprises a plurality of time slots, the arrangement comprises a timing reference and the means for generating pointers is arranged to generate pointers identifying first time slots in the frames, relative to the timing reference.

* * * * *